(12) United States Patent
Kanno et al.

(10) Patent No.: US 12,338,160 B2
(45) Date of Patent: Jun. 24, 2025

(54) METHOD FOR DIVIDING COMPOSITE MATERIAL

(71) Applicant: NITTO DENKO CORPORATION, Ibaraki (JP)

(72) Inventors: Toshihiro Kanno, Ibaraki (JP); Satoshi Hirata, Ibaraki (JP); Kota Nakai, Ibaraki (JP); Naoyuki Matsuo, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 584 days.

(21) Appl. No.: 17/627,543

(22) PCT Filed: Feb. 19, 2020

(86) PCT No.: PCT/JP2020/006411
§ 371 (c)(1),
(2) Date: Jan. 14, 2022

(87) PCT Pub. No.: WO2021/009960
PCT Pub. Date: Jan. 21, 2021

(65) Prior Publication Data
US 2022/0315472 A1    Oct. 6, 2022

(30) Foreign Application Priority Data
Jul. 16, 2019    (JP) .................................. 2019-131510

(51) Int. Cl.
*C03B 33/02* (2006.01)
*B23K 26/0622* (2014.01)
(Continued)

(52) U.S. Cl.
CPC ...... *C03B 33/0222* (2013.01); *B23K 26/0624* (2015.10); *B23K 26/364* (2015.10);
(Continued)

(58) Field of Classification Search
CPC .. C03B 33/074; C03B 33/0222; C03B 33/091
See application file for complete search history.

(56) References Cited

U.S. PATENT DOCUMENTS

| 5,622,540 A | 4/1997 | Stevens |
|---|---|---|
| 9,102,011 B2 | 8/2015 | Hosseini |

(Continued)

FOREIGN PATENT DOCUMENTS

| CN | 104552629 A | 4/2015 |
|---|---|---|
| CN | 104685553 A | 6/2015 |

(Continued)

OTHER PUBLICATIONS

Office Action dated Oct. 10, 2023, issued in counterpart CN Application No. 202080051158.5, with English translation. (14 pages).

(Continued)

*Primary Examiner* — Erin Snelting
(74) *Attorney, Agent, or Firm* — WHDA, LLP

(57) ABSTRACT

A method is disclosed for dividing a composite material in which a brittle material layer and a resin layer are laminated, including: a resin removing step of irradiating the resin layer with a laser beam oscillated from a first laser source along a scheduled dividing line of the composite material to form a processing groove along the scheduled dividing line; a brittle material removing step of irradiating the brittle material layer with a laser beam oscillated from an ultrashort pulsed laser source along the scheduled dividing line to form a processing mark along the scheduled dividing line; and a brittle material layer dividing step of generating thermal stress in the brittle material layer by irradiating the brittle material layer with a laser beam oscillated from a second laser source from the opposite side to the resin layer to thereby divide the brittle material layer.

8 Claims, 5 Drawing Sheets

(51) Int. Cl.
  *B23K 26/364*  (2014.01)
  *B23K 26/402*  (2014.01)
  *B23K 26/53*   (2014.01)
  *C03B 33/033*  (2006.01)
  *C03B 33/07*   (2006.01)
  *C03B 33/09*   (2006.01)
  *B23K 101/18*  (2006.01)
  *B23K 103/00*  (2006.01)
  *B23K 103/16*  (2006.01)

(52) U.S. Cl.
  CPC ............ *B23K 26/402* (2013.01); *B23K 26/53* (2015.10); *C03B 33/033* (2013.01); *C03B 33/074* (2013.01); *C03B 33/091* (2013.01); *B23K 2101/18* (2018.08); *B23K 2103/172* (2018.08); *B23K 2103/42* (2018.08); *B23K 2103/54* (2018.08)

(56) References Cited

U.S. PATENT DOCUMENTS

| | | |
|---|---|---|
| 10,376,986 B2 | 8/2019 | Hosseini |
| 2002/0006765 A1 | 1/2002 | Michel et al. |
| 2006/0275989 A1 | 12/2006 | Ting et al. |
| 2015/0146294 A1 | 5/2015 | Watanabe |
| 2015/0165560 A1* | 6/2015 | Hackert ............... C03B 33/082  428/131 |
| 2015/0232369 A1 | 8/2015 | Marjanovic et al. |
| 2015/0367621 A1 | 12/2015 | Murashige et al. |
| 2016/0152506 A1 | 6/2016 | Jotz et al. |
| 2018/0057390 A1 | 3/2018 | Hackert et al. |
| 2018/0179100 A1 | 6/2018 | Marjanovic et al. |
| 2019/0118306 A1 | 4/2019 | Yuan et al. |

FOREIGN PATENT DOCUMENTS

| | | |
|---|---|---|
| CN | 105073660 A | 11/2015 |
| CN | 105645753 A | 6/2016 |
| CN | 106029590 A | 10/2016 |
| CN | 106102986 A | 11/2016 |
| CN | 107922237 A | 4/2018 |
| EP | 2960216 A1 | 12/2015 |
| EP | 3470166 A1 | 4/2019 |
| JP | 10-506087 A | 6/1998 |
| JP | 2007-021527 A | 2/2007 |
| JP | 2011-178636 A | 9/2011 |
| JP | 2016-083926 A | 5/2016 |
| JP | 2017-145188 A | 8/2017 |
| JP | 6239461 B2 | 11/2017 |
| JP | 2018-519229 A | 7/2018 |
| JP | 2018-170474 A | 11/2018 |
| JP | 2018-170475 A | 11/2018 |
| KR | 10-2015-0105998 A | 9/2015 |
| KR | 10-2017-0131586 A | 11/2017 |
| WO | 2013/175767 A1 | 11/2013 |
| WO | 2015/095088 A1 | 6/2015 |

OTHER PUBLICATIONS

Extended (Supplementary) European Search Report dated Jul. 26, 2023, issued in counterpart EP application No. 20839554.1. (8 pages).
International Search Report dated Apr. 21, 2020, issued in counterpart International Application No. PCT/JP2020/006411. (3 pages).
Lopez et al., "Glass cutting using ultrashort pulsed bessel beams", ResearchGate, Oct. 2015. (11 pages).
Office Action dated Jul. 10, 2024, issued in counterpart KR Application No. 10-2021-7040240, with English translation. (9 pages).

* cited by examiner

Figure 4

| | Second Laser Source | | | | | Division State of Brittle Material Layer | Heat Discoloration Width |
|---|---|---|---|---|---|---|---|
| | Irradiation of Laser Beam | Output [W] | Spot Diameter [mm] | Moving Speed [mm/sec] | Energy Density of Laser Beam [W/mm²] | | |
| Example 1 | From Processing Mark Side | 24 | 0.7 | 500 | 62 | A | A |
| Example 2 | From Processing Mark Side | 15 | 0.7 | 400 | 39 | A | A |
| Example 3 | From Processing Mark Side | 27 | 0.7 | 500 | 70 | A | A |
| Example 4 | From Processing Mark Side | 30 | 0.7 | 500 | 78 | A | A |
| Example 5 | From Processing Mark Side | 3 | 0.5 | 400 | 15 | B | A |
| Example 6 | From Processing Mark Side | 0.6 | 0.2 | 500 | 19 | B | A |
| Example 7 | From Processing Mark Side | 4.5 | 1 | 75 | 5.7 | B | A |
| Example 8 | From Processing Mark Side | 4.5 | 1 | 50 | 5.7 | A | B |
| Example 9 | From Processing Mark Side | 7.5 | 1 | 100 | 9.5 | A | A |
| Example 10 | From Processing Mark Side | 3 | 2 | 200 | 0.95 | A | C |
| Example 11 | From Processing Mark Side | 3 | 2 | 25 | 0.95 | B | C |
| Reference Example | From Processing Groove Side | 24 | 0.7 | 500 | 62 | A | D |

METHOD FOR DIVIDING COMPOSITE MATERIAL

TECHNICAL FIELD

The present invention relates to a method for dividing a composite material in which a brittle material layer and a resin layer are laminated. In particular, the present invention relates to a method that is capable of dividing a composite material without causing a crack in an end face of the brittle material layer and also without deteriorating the quality level of an end portion of the resin layer.

BACKGROUND ART

In recent years, in addition to progress in achieving increasingly thinner and higher definition liquid crystal panels, liquid crystal panels that have a touch sensor function on the screen to impart diversity to interfaces are being used in a wide range of fields from mobile phones to information displays.

A commonly used liquid crystal panel with a touch sensor function is a liquid crystal panel in which a film or glass having a sensor function is laminated on a polarizing film, and tempered glass referred to as a "front plate" is arranged on the outermost surface via a thick adhesive layer (OCA: optical clear adhesive) for filling the level difference on the sensor surface. Recently, from the viewpoint of thinning and weight reduction, liquid crystal panels having an in-cell type liquid crystal cell in which a touch sensor is incorporated into a glass substrate of the liquid crystal cell have appeared.

On the other hand, whilst studies are being conducted with respect to using a component formed of resin as a front plate and providing the resin-made front plate with a high hardness, the current situation is that sufficient hardness has not been obtained. Resin-made front plates also have a problem of inferiority in humidity resistance.

In view of the foregoing, a film-shaped glass that is referred to as "thin glass" has been attracting attention as a front plate to be arranged on the outermost surface of a liquid crystal panel. The thin glass can be wound in a roll shape, and hence has an advantage in that the thin glass can also be adapted to a so-called "roll-to-roll" production process, and a glass polarizing film in which the thin glass is integrated with a polarizing film has been proposed (for example, see Patent Literature 1).

Since a liquid crystal panel with a touch sensor function can be obtained merely by bonding the glass polarizing film to an in-cell type liquid crystal cell, the production process can be made much simpler in comparison to a common liquid crystal panel that uses tempered glass as a front plate.

In this connection, as a method for dividing a composite material in which a brittle material layer formed from glass and a resin layer formed from a polarizing film or the like are laminated as described above, into a desired shape and dimensions according to the intended application, a method in which the resin layer is subjected to laser beam processing, and the brittle material layer is processed with a mechanical tool is conceivable (for example, see Patent Literature 2).

However, according to studies conducted by the present inventors it has been found that processing the brittle material layer with a mechanical tool after the resin layer has been subjected to laser beam processing may create a crack in the end face of the brittle material layer.

Here, there is a known technique that performs precision processing of a brittle material by irradiating the brittle material such as glass (for example, see Patent Literature 3) with a laser beam (ultrashort pulsed laser beam) oscillated from an ultrashort pulsed laser source, which is different from a laser source used in the aforementioned laser beam processing. The processing technique that uses an ultrashort pulsed laser beam as described in Patent Literature 3 is excellent in productivity and is also excellent in quality without causing a crack in an end face after processing.

However, although the processing technique that uses an ultrashort pulsed laser beam is effective for a single body of brittle material such as glass, using the processing technique for collectively dividing a composite material in which a brittle material layer and a resin layer are laminated is difficult, because the processing technique leads to a decrease in the quality of end faces after dividing. For example, even if an ultrashort pulsed laser beam is irradiated from the brittle material layer side of a composite material, an end portion of the resin layer will be subjected to thermal degradation by the ultrashort pulsed laser beam that is not consumed when removing the brittle material forming the brittle material layer and is transmitted to the resin layer side.

Non Patent Literature 1 discloses that in the processing technique utilizing an ultrashort pulsed laser beam, a filamentation phenomenon of the ultrashort pulsed laser beam is utilized, and a multi-focus optical system or a Bessel beam optical system is applied for the ultrashort pulsed laser source.

CITATION LIST

Patent Literature

[Patent Literature 1] WO 2013-175767
[Patent Literature 2] JP2011-178636A
[Patent Literature 3] JP6239461B

Non Patent Literature

[Non Patent Literature 1] John Lopez, et al., "GLASS CUTTING USING ULTRASHORT PULSED BESSEL BEAMS", [online], October 2015, International Congress on Applications of Lasers & Electro-Optics (ICALEO), [searched on Jul. 8, 2019], the Internet (URL: https://www.researchgate.net/publication/284617626_GLASS_CUTTING_USING_ULTRASHORT_PULSED_BESSEL_BEAMS)

SUMMARY OF INVENTION

Technical Problem

The present invention has been made to solve the problem of the prior art that is described above, and an objective of the present invention is to provide a method for dividing a composite material which is a method that is capable of dividing a composite material in which a brittle material layer and a resin layer are laminated, and does not cause a crack in an end face of the brittle material layer and also does not cause the quality level of an end portion of the resin layer to deteriorate.

Solution to Problem

To solve the above problem, with respect to the technique disclosed in the aforementioned Patent Literature 2, the present inventors considered applying a method that, instead of the method that processes a brittle material layer using a mechanical tool, processes a brittle material layer using an ultrashort pulsed laser beam as disclosed in the aforementioned Patent Literature 3. Further, the present inventors considered applying a method in which, thereafter, a mechanical external force is applied to the brittle material layer to divide the brittle material layer.

However, the present inventors found that, similarly to the method disclosed in Patent Literature 2, when a mechanical external force is applied to the brittle material layer to divide the brittle material layer, in some cases a crack occurs in the end face of the brittle material layer.

Therefore, as the result of diligent studies the present inventors discovered that, after a brittle material layer has been processed using an ultrashort pulsed laser beam, by applying heat to the brittle material layer to generate thermal stress in the brittle material layer it is possible to divide (fracture) the brittle material layer without causing a crack in an end face of the brittle material layer. Further, at such time, by applying heat to the brittle material layer from the brittle material layer side, and not by heat conduction from the resin layer side, the quality level of an end portion of the resin layer is not deteriorated (there is little discoloration associated with thermal degradation of the resin layer).

The present invention was completed based on the above findings of the present inventors.

That is, to solve the above problem, the present invention provides a method for dividing a composite material in which a brittle material layer and a resin layer are laminated, the method including: a resin removing step of irradiating the resin layer with a laser beam oscillated from a first laser source along a scheduled dividing line of the composite material to remove a resin forming the resin layer, to thereby form a processing groove along the scheduled dividing line; after the resin removing step, a brittle material removing step of irradiating the brittle material layer with a laser beam oscillated from an ultrashort pulsed laser source along the scheduled dividing line to remove a brittle material forming the brittle material layer, to thereby form a processing mark along the scheduled dividing line; and after the brittle material removing step, a brittle material layer dividing step of applying heat to the brittle material layer from an opposite side to the resin layer along the scheduled dividing line to generate thermal stress in the brittle material layer, to thereby divide the brittle material layer.

According to the method according to the present invention, after the processing groove is formed along the scheduled dividing line by removing resin forming the resin layer in the resin removing step, in the brittle material removing step the processing mark is formed along the same scheduled dividing line by removing the brittle material forming the brittle material layer. Thereafter, in the brittle material layer dividing step, by applying heat to the brittle material layer from the opposite side (the brittle material layer side among the brittle material layer and the resin layer) to the resin layer along the same scheduled dividing line to generate thermal stress in the brittle material layer, in accordance with the aforementioned findings of the present inventors, it is possible to divide the brittle material layer without causing a crack in the end face of the brittle material layer, and the quality level of the end portion of the resin layer is also not deteriorated.

Note that, in a case where a residue of resin does not remain at the bottom of the processing groove that is formed by removing resin that forms the resin layer in the resin removing step, it is possible to divide the composite material by executing only the resin removing step, the brittle material removing step and the brittle material layer dividing step.

In a case where a residue of resin remains at the bottom of the processing groove, after executing the resin removing step, the brittle material removing step and the brittle material layer dividing step, it is possible to divide the composite material by, for example, applying a mechanical external force to the resin layer in order to divide the residue of resin. Even if a mechanical external force is applied to the resin layer and, by extension, the brittle material layer, since the brittle material layer has already been divided at this point by the brittle material layer dividing step, a crack will not occur in an end face of the brittle material layer.

Note that, in the method according to the present invention, the phrase "irradiating the resin layer with a laser beam along a scheduled dividing line of the composite material" means that the resin layer is irradiated with a laser beam along a scheduled dividing line as viewed from the thickness direction of the composite material (lamination direction of the brittle material layer and the resin layer). Further, in the method according to the present invention, the phrase "irradiating the brittle material layer with a laser beam along the scheduled dividing line" means that the brittle material layer is irradiated with a laser beam along the scheduled dividing line as viewed from the thickness direction of the composite material (lamination direction of the brittle material layer and the resin layer).

Further, in the method according to the present invention, the kind of the first laser source that is used in the resin removing step is not particularly limited as long as resin forming the resin layer can be removed by the oscillated laser beam. However, from the viewpoint that it is possible to increase the relative moving speed (processing speed) of the laser beam with respect to the composite material, it is preferable to use a $CO_2$ laser source or a CO laser source that oscillates a laser beam with a wavelength in the infrared region.

In the method of the present invention, as the processing mark that is formed in the brittle material removing step, for example, perforation-like through holes along the scheduled dividing line can be mentioned as an example. In this case, in the brittle material layer dividing step, due to thermal stress generated in the brittle material layer, a crack develops along the scheduled dividing line in a manner that connects together the perforation-like through holes, and the brittle material layer is divided (fractured).

However, the processing mark formed in the brittle material removing step is not necessarily limited to the perforation-like through holes. In the brittle material removing step, if the relative moving speed between a laser beam oscillated from an ultrashort pulsed laser source and the brittle material layer along the scheduled dividing line is set to a low value, or the repetition frequency of the pulse oscillation of the ultrashort pulsed laser source is set to a large value, through holes (long hole) that are integrally connected along the scheduled dividing line will be formed as the processing mark. Even in this case, it is possible to reliably divide the brittle material layer by executing the brittle material layer dividing step.

Preferably, in the brittle material layer dividing step, thermal stress is generated in the brittle material layer by irradiating the brittle material layer with a laser beam oscillated from a second laser source from an opposite side to the resin layer.

According to the preferable method described above, of the two faces of the brittle material layer, the temperature of a face on the side irradiated with the laser beam oscillated from the second laser source becomes relatively higher, and the temperature of a face on the opposite side to the side irradiated with the laser beam becomes relatively lower. As a result, compressive stress arises in the face on the side irradiated with the laser beam, and tensile stress arises in the face on the opposite side to the side irradiated with the laser beam. Due to this stress difference, a crack develops with the processing mark serving as a starting point, and the brittle material layer is divided (fractured).

Note that, in the preferable method described above, the kind of second laser source used in the brittle material layer dividing step is not particularly limited as long as the brittle material layer can be divided by thermal stress generated by the oscillated laser beam. Similarly to the first laser source, a $CO_2$ laser source or a CO laser source that oscillates a laser beam with a wavelength in the infrared region can be used as the second laser source.

Note that, a method for generating thermal stress in the brittle material layer in the brittle material layer dividing step is not limited to a method that irradiates the brittle material layer with a laser beam oscillated from the second laser source, and it is also possible to adopt a method that makes the brittle material layer a high temperature and thereafter cools the brittle material layer. Specifically, it is also possible to adopt a method that heats the brittle material layer to a temperature of several hundred ° C. using hot air from a dryer or the like, and thereafter, before the temperature falls, blows drops of water or cold air against the brittle material layer to thereby generate thermal stress by means of the temperature difference at the time of cooling.

Preferably, in the brittle material layer dividing step, a spot diameter of the laser beam oscillated from the second laser source at an irradiation position on the brittle material layer is 2 mm or less.

According to the preferable method described above, since the spot diameter of the laser beam oscillated from the second laser source is not excessively large, the influence of heat conduction to the resin layer can be made small.

Preferably, in the brittle material layer dividing step, a spot diameter of the laser beam oscillated from the second laser source at an irradiation position on the brittle material layer is 400 μm or more.

According to the preferable method described above, since the spot diameter of the laser beam oscillated from the second laser source is not excessively small, there is the advantage that it is easy to irradiate the laser beam oscillated from the second laser source along the scheduled dividing line.

Preferably, in the brittle material layer dividing step, an energy density of the laser beam oscillated from the second laser source at an irradiation position on the brittle material layer is 78 W/mm$^2$ or less.

According to the preferable method described above, since the energy density (=output of laser beam/spot area of laser beam) of the laser beam oscillated from the second laser source is not excessively large, the influence of heat conduction to the resin layer can be made small.

Since the laser beam oscillated from the first laser source is used for forming a processing groove along the scheduled dividing line in the resin removing step, it is necessary to make the spot diameter small to a certain extent so that the width of the processing groove does not become excessively large. In contrast, since the laser beam oscillated from the second laser source is used for applying heat to the brittle material layer in the brittle material layer dividing step to generate thermal stress, it is not necessary to make the spot diameter as small as when forming the processing groove. That is, because the application purposes of the respective laser beams are different to each other, preferably the spot diameter of the laser beam oscillated from the first laser source is smaller than the spot diameter of the laser beam oscillated from the second laser source.

Specifically, in the resin removing step, a spot diameter of the laser beam oscillated from the first laser source at an irradiation position on the resin layer is 300 μm or less.

A thickness of the brittle material layer to which the method according to the present invention is applied is, for example, 30 to 150 μm, and a thickness of the resin layer is, for example, 50 to 300 μm.

Preferably, in the brittle material layer dividing step, after thermal stress is generated in the brittle material layer, a mechanical external force is applied to the brittle material layer along the scheduled dividing line.

Preferably, in the brittle material layer dividing step, after thermal stress is generated in the brittle material layer, air is blown against the brittle material layer from a processing groove side along the scheduled dividing line.

According to the preferable method described above, in addition to the fact that thermal stress is generated in the brittle material layer, since a mechanical external force is applied to the brittle material layer or air is blown against the brittle material layer, it is possible to reliably divide the brittle material layer.

The method according to the present invention is suitably used when the brittle material layer includes glass, and the resin layer includes a polarizing film, for example.

According to the method of the present invention, a discoloration region associated with thermal degradation of the resin layer after the brittle material layer dividing step can be a region of less than 1000 μm from an end face of the brittle material layer that is divided.

Advantageous Effect of Invention

According to the present invention, it is possible to divide a composite material in which a brittle material layer and a resin layer are laminated, without generating a crack in an end face of the brittle material layer and also without causing a deterioration in the quality level of an end portion of the resin layer.

BRIEF DESCRIPTION OF DRAWINGS

FIG. 4 is a table showing conditions and evaluation results of a test according to Examples 1 to 11 and Reference Example.

DESCRIPTION OF EMBODIMENT

Figure 1A:
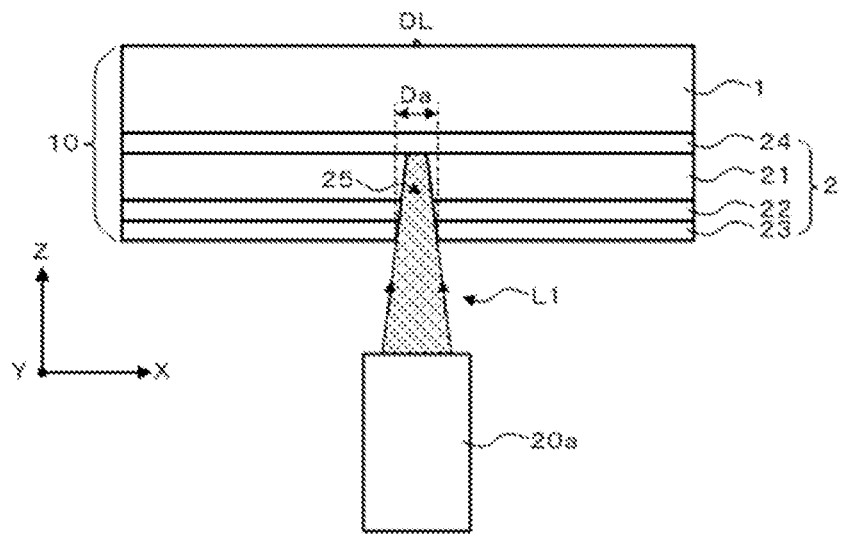
FIGS. 1A-1B are an explanatory diagrams for schematically describing procedures of a method for dividing a composite material according to one embodiment of the present invention.

Hereunder, a method for dividing a composite material according to one embodiment of the present invention is described with reference being made as appropriate to the attached drawings.

FIGS. 1 to 3 are explanatory diagrams for schematically describing procedures of a method for dividing a composite material according to one embodiment of the present invention.

FIG. 1 (a) is a cross-sectional view illustrating a resin removing step of the dividing method according to the present embodiment, and FIG. 1 (b) is a cross-sectional view illustrating a brittle material removing step of the dividing method according to the present embodiment.

FIGS. 2 (a) and 2 (b) are cross-sectional views illustrating a brittle material dividing step of the dividing method according to the present embodiment.

FIG. 3 (a) is a plan view (view as seen from a brittle material layer side) illustrating the brittle material removing step of the dividing method according to the present embodiment, and FIG. 3 (b) is a perspective view illustrating the brittle material removing step of the dividing method according to the present embodiment.

Note that, in FIGS. 3 (a) and 3 (b), illustration of an ultrashort pulsed laser source 30 is omitted.

The dividing method according to the present embodiment is a method that divides a composite material 10 in which a brittle material layer 1 and a resin layer 2 are laminated, in the thickness direction (lamination direction of the brittle material layer 1 and the resin layer 2; vertical direction (or Z direction) in FIG. 1).

The brittle material layer 1 and the resin layer 2 are laminated by an arbitrary appropriate method. For example, the brittle material layer 1 and the resin layer 2 can be laminated by a so-called "roll-to-roll method". That is, while conveying the long brittle material layer 1 and a main body (in the present embodiment, a polarizing film 21, a pressure-sensitive adhesive 22 and a release liner 23 constituting the resin layer 2) of the long resin layer 2 in the longitudinal direction, the brittle material layer 1 and the resin layer 2 can be laminated by bonding the brittle material layer 1 and the resin layer 2 to each other through a bonding agent 24 in a manner so that the longitudinal directions of the brittle material layer 1 and the resin layer 2 are aligned with each other. Further, the brittle material layer 1 and the main body of the resin layer 2 may be laminated after being cut into a predetermined shape, respectively.

Glass and single crystal or polycrystalline silicon can be mentioned as examples of the brittle material forming the brittle material layer 1. Ideally, glass is used.

According to classification by composition, examples of the glass that can be mentioned include soda-lime glass, borate glass, aluminosilicate glass, quartz glass and sapphire glass. Further, according to classification by alkali component, non-alkali glass and low-alkali glass can be mentioned as examples. The content of alkali metal components (for example, $Na_2O$, $K_2O$ and $Li_2O$) in the glass is preferably 15% by weight or less, and more preferably 10% by weight or less.

The thickness of the brittle material layer 1 is preferably 150 μm or less, more preferably is 120 μm or less, and further preferably is 100 μm or less. On the other hand, the thickness of the brittle material layer 1 is preferably 30 μm or more, and more preferably is 80 μm or more. As long as the thickness of the brittle material layer 1 is within this kind of range, it is possible to laminate the brittle material layer 1 and the resin layer 2 together by the roll-to-roll method.

When the brittle material forming the brittle material layer 1 is glass, the light transmittance of the brittle material layer 1 at a wavelength of 550 nm is preferably 85% or more. When the brittle material forming the brittle material layer 1 is glass, the refractive index of the brittle material layer 1 at a wavelength of 550 nm is preferably 1.4 to 1.65. When the brittle material forming the brittle material layer 1 is glass, the density of the brittle material layer 1 is preferably 2.3 g/cm³ to 3.0 g/cm³, and more preferably is 2.3 g/cm³ to 2.7 g/cm³.

When the brittle material forming the brittle material layer 1 is glass, as the brittle material layer 1, a commercially available glass plate may be used as it is, or a commercially available glass plate may be polished to a desired thickness for use. Examples of commercially available glass plates include "7059", "1737" or "EAGLE2000" manufactured by Corning Inc., "AN100" manufactured by Asahi Glass Co., Ltd., "NA-35" manufactured by NH Techno Glass Co., Ltd., "OA-10G" manufactured by Nippon Electric Glass Co., Ltd., and "D263" or "AF45" manufactured by Schott AG.

Examples of the main body of the resin layer 2 that can be mentioned include a single-layer film or a laminated film composed of multiple layers which is formed of polyethylene terephthalate (PET), polyethylene (PE), polypropylene (PP), acrylic resin such as polymethyl methacrylate (PMMA), a cyclic olefin polymer (COP), a cyclic olefin copolymer (COC), a polycarbonate (PC), urethane resin, a polyvinyl alcohol (PVA), a polyimide (PI), polytetrafluoroethylene (PTFE), polyvinyl chloride (PVC), polystyrene (PS), triacetylcellulose (TAC), polyethylene naphthalate (PEN), ethylene vinyl acetate (EVA), a polyamide (PA), silicone resin, epoxy resin, a liquid crystal polymer, or a plastic material such as various kinds of resin foam.

When the main body of the resin layer 2 is a laminated film composed of multiple layers, various kinds of pressure-sensitive adhesive such as acrylic pressure-sensitive adhesives, urethane pressure-sensitive adhesives, and silicone pressure-sensitive adhesives, or bonding agents may be interposed between layers.

Further, an electroconductive inorganic membrane composed of indium tin oxide (ITO), Ag, Au, or Cu or the like may be formed on the surface of the main body of the resin layer 2.

The dividing method according to the present embodiment is, in particular, favorably used when the main body of the resin layer 2 is an optical film of various kinds such as a polarizing film or a phase difference film used for a display.

The thickness of the main body of the resin layer 2 is preferably 20 to 500 μm, and more preferably is 50 to 300 μm.

Note that, in the example illustrated in FIG. 1, an example is shown in which the main body of the resin layer 2 is a laminated film in which the polarizing film 21 and the release liner 23 are laminated via the pressure-sensitive adhesive 22. The main body of the resin layer 2 is laminated with the brittle material layer 1 via the bonding agent 24. In the present embodiment, the combination of the main body (the polarizing film 21, the pressure-sensitive adhesive 22 and the release liner 23) of the resin layer 2 and the bonding agent 24 is referred to as the "resin layer 2".

The polarizing film 21 has a polarizer, and a protective film disposed on at least one side of the polarizer. The thickness of the polarizer is not particularly limited, and an appropriate thickness can be adopted according to the purpose. The thickness of the polarizer is typically within the range of about 1 to 80 μm. In one mode, the thickness of the polarizer is preferably 30 μm or less. The polarizer is an iodine-based polarizer. More specifically, the aforementioned polarizer can be made from a polyvinyl alcohol-based resin film containing iodine.

The following methods 1, 2 and the like can be mentioned as examples of a method for producing the polarizer constituting the polarizing film 21.

(1) Method 1: A method that stretches and dyes a polyvinyl alcohol-based resin film alone.

(2) Method 2: A method that stretches and dyes a laminate (i) having a resin base material and a polyvinyl alcohol-based resin layer.

The method 1 is a method that is well-known and conventionally used in the art, and hence a detailed description thereof will be omitted here.

The method 2 preferably includes a step of stretching and dyeing the laminate (i) having the resin base material and the polyvinyl alcohol-based resin layer formed on one side of the resin base material to produce a polarizer on the resin base material. The laminate (i) can be formed by applying an application liquid containing a polyvinyl alcohol-based resin onto the resin base material and drying the applied liquid. In addition, the laminate (i) may be formed by transferring a polyvinyl alcohol-based resin film onto the resin base material. The method 2 is described in detail in, for example, JP2012-73580A, whose contents are incorporated herein as a reference.

The protective film constituting a part of the polarizing film 21 is disposed on one side or both sides of the polarizer. A triacetylcellulose-based film, an acrylic-based film, a cycloolefin-based film, a polyethylene terephthalate-based film or the like can also be used as the protective film. Note that, as appropriate, the polarizing film 21 may be further provided with a phase difference film. The phase difference film can have any appropriate optical properties and/or mechanical properties depending on the intended purpose.

For example, a polyester-based bonding agent, a polyurethane-based bonding agent, a polyvinyl alcohol-based bonding agent, or an epoxy-based bonding agent can be used as the bonding agent 24. In particular, from the viewpoint that satisfactory adherence is obtained, use of an epoxy-based bonding agent is preferable.

When the bonding agent 24 is a thermosetting bonding agent, peeling resistance force can be exhibited by heating and curing (setting) the bonding agent 24. Further, when the bonding agent 24 is a photocurable bonding agent such as an ultraviolet curable bonding agent, peeling resistance force can be exhibited by irradiating the bonding agent 24 with light such as ultraviolet light to cure the bonding agent 24. In addition, when the bonding agent 24 is a moisture curable bonding agent, since the bonding agent 24 can be cured by reacting with moisture or the like in the atmosphere, even if the bonding agent 24 is left to stand, the bonding agent 24 will cure and peeling resistance force can be exhibited.

For example, a commercially available bonding agent may be used as the bonding agent 24, or various kinds of curable resin may be dissolved or dispersed in a solvent to prepare a bonding agent solution (or dispersion).

The thickness of the bonding agent 24 is preferably 10 μm or less, more preferably is 1 to 10 μm, further preferably is 1 to 8 μm, and particularly preferably is 1 to 6 μm.

The dividing method according to the present embodiment includes the resin removing step, the brittle material removing step, and the brittle material dividing step. Hereinafter, each step will be described successively.

<Resin Removing Step>

As illustrated in FIG. 1A, in the resin removing step, the resin layer 2 is irradiated with a laser beam L1 oscillated from a first laser source 20a along the scheduled dividing line of the composite material 10 to remove the resin forming the resin layer 2. By this means, a processing groove 25 is formed along the scheduled dividing line.

Although in the example illustrated in FIGS. 1 to 3, for convenience, a case is illustrated in which, out of two orthogonal directions (X direction and Y direction) in a plane (X-Y two-dimensional plane) of the composite material 10, a straight line DL extending in the Y direction is the scheduled dividing line, the present invention is not limited to this example, and it is possible to set various scheduled dividing lines such as, for example, scheduled dividing lines in which a plurality of straight lines DL extending in the X direction and a plurality of straight lines DL extending in the Y direction are set in a grid pattern. Hereunder, the straight line DL is referred to as a "scheduled dividing line DL".

The scheduled dividing line DL can be actually drawn on the composite material 10 as a visually recognizable indication, and it is also possible to input the coordinates of the scheduled dividing line DL in advance into a control device (not shown) which controls the relative positional relationship between the laser beam L1 and the composite material 10 on the X-Y two-dimensional plane. The scheduled dividing line DL shown in FIGS. 1 to 3 is a virtual line whose coordinates are input in advance to the control device and which is not actually drawn on the composite material 10. Note that the scheduled dividing line DL is not limited to a straight line, and may be a curved line. By determining the scheduled dividing line DL according to the application of the composite material 10, the composite material 10 can be divided into any shape and dimensions according to the application.

In the present embodiment, a $CO_2$ laser source which oscillates a laser beam L1 having a wavelength of 9 to 11 μm in the infrared region is used as the first laser source 20a.

However, the present invention is not limited to this, and it is also possible to use a CO laser source which oscillates a laser beam L1 having a wavelength of 5 μm as the first laser source 20a.

Further, as the first laser source 20a, it is also possible to use pulsed laser sources that oscillate visible light and ultraviolet rays (UV). Examples of pulsed laser sources that oscillate visible light and UV that can be mentioned include those which oscillate a laser beam L1 having a wavelength of 532 nm, 355 nm, 349 nm, or 266 nm (higher-order harmonics of Nd:YAG, Nd:YLF, or a solid laser source using YVO4 as a medium), an excimer laser source which oscillates a laser beam L1 having a wavelength of 351 nm, 248 nm, 222 nm, 193 nm or 157 nm, and an F2 laser source which oscillates a laser beam L1 having a wavelength of 157 nm.

Further, as the first laser source 20a, it is also possible to use a pulsed laser source which oscillates a laser beam L1 having a wavelength outside the ultraviolet region and having a pulse width of femtosecond or picosecond order. Using the laser beam L1 oscillated from this pulsed laser source makes it possible to induce ablation processing based on the multiphoton absorption process.

In addition, as the first laser source 20a, it is possible to use a semiconductor laser source or a fiber laser source which oscillates a laser beam L1 having a wavelength in the infrared region.

As a mode of irradiating the laser beam L1 along the scheduled dividing line of the composite material 10 (a mode of scanning the laser beam L1), it is conceivable, for example, that a sheet-like composite material 10 is placed on an X-Y dual-axis stage (not shown) and fixed (for example, fixed by suction) thereto, and the X-Y dual-axis stage is driven by a control signal from the control device so as to change the relative position of the composite material 10 on the X-Y two-dimensional plane with respect to the laser beam L1. Further, it is also conceivable to change the position on the X-Y two-dimensional plane of the laser beam L1 with which the composite material 10 is irradiated, by fixing the position of the composite material 10 and deflecting the laser beam L1 oscillated from the first laser source 20a by using a galvanometer mirror or a polygon mirror driven by a control signal from the control device. In addition, it is also possible to use a combination of both the scanning of the composite material 10 by use of the aforementioned X-Y dual-axis stage and the scanning of the laser beam L1 by use of a galvanometer mirror or the like.

The oscillation mode of the first laser source 20a may be pulse oscillation or may be continuous oscillation. The spatial intensity distribution of the laser beam L1 may be a Gaussian distribution, or may be shaped into a flat-top distribution by using a diffractive optical element (not shown) or the like to suppress heat damage to the brittle material layer 1 that is other than the removal target of the laser beam L1. There is no restriction on the polarization state of the laser beam L1, and it may be any of linear polarization, circular polarization, and random polarization.

As a result of the resin layer 2 being irradiated with the laser beam L1 along the scheduled dividing line DL of the composite material 10, among the resin forming the resin layer 2, a local temperature increase associated with infrared light absorption occurs in the resin which has been irradiated with the laser beam L1, which causes the relevant resin to scatter, and thereby the relevant resin is removed from the composite material 10 and the processing groove 25 is formed in the composite material 10. In order to suppress the occurrence of a situation in which the debris of the resin which was removed from the composite material 10 re-adheres to the composite material 10, it is preferable to provide a dust collection mechanism in the vicinity of the scheduled dividing line DL. To inhibit the groove width of the processing groove 25 from becoming too large, preferably the laser beam L1 is condensed so that a spot diameter Da thereof (see FIG. 1A) at the irradiation position on the resin layer 2 is 300 µm or less, and more preferably the laser beam L1 is condensed so that the spot diameter Da is 200 µm or less.

Note that, according to findings of the present inventors, in the case of a resin removing method based on the principle of local temperature increase associated with infrared light absorption of the resin irradiated with the laser beam L1, it is possible, regardless of the type of the resin and the layer structure of the resin layer 2, to roughly estimate the input energy required to form the processing groove 25 by the thickness of the resin layer 2. Specifically, the input energy required to form the processing groove 25, which is represented by the following Formula (1), can be estimated by the following Formula (2) based on the thickness of the resin layer 2.

$$\text{Input energy [mJ/mm]} = \text{Average power of laser beam } L1 \text{ [mW]/processing speed [mm/sec]} \quad (1)$$

$$\text{Input energy [mJ/mm]} = 0.5 \times \text{thickness of resin layer 2 [µm]} \quad (2)$$

The input energy to be actually set is preferably set to 20% to 180% of the input energy estimated by the above Formula (2), and more preferably set to 50% to 150% thereof. The reason why a margin is provided for the input energy estimated in this way is to take into consideration that differences may arise with respect to the input energy required to form the processing groove 25 due to differences in thermophysical properties such as the light absorption rate (light absorption rate at the wavelength of the laser beam L1) of the resin forming the resin layer 2 and the melting point and decomposition point of the resin. Specifically, it suffices to determine the appropriate input energy, for example, by preparing a sample of the composite material 10 to which the dividing method according to the present embodiment is applied, and performing a preliminary test to form the processing groove 25 in the resin layer 2 of this sample with a plurality of input energies within the aforementioned preferable range.

Note that, in the resin removing step of the present embodiment, a configuration is adopted so that the laser beam L1 oscillated from the first laser source 20a is not irradiated multiple times in a region where the scheduled dividing lines DL intersect. Specifically, as described above, since the coordinates of the scheduled dividing lines DL are input in advance into the control device, the control device can recognize the coordinates of a region where the scheduled dividing lines DL intersect. Accordingly, the control device can control the output of the laser beam L1 with which the intersection region is irradiated to 0% when the laser beam L1 is about to be scanned for the second time in an intersection region of the scheduled dividing lines DL. The same also applies with respect to a case where the laser beam L1 is to be scanned three times or more in an intersection region. By this means, in a region where the scheduled dividing lines DL intersect, the laser beam L1 oscillated from the first laser source 20a is not irradiated multiple times.

Thus, in a region where the scheduled dividing lines DL intersect, because the laser beam L1 is not irradiated multiple times, heat damage applied to the brittle material layer 1 is reduced. By this means, an advantage is obtained such that, when forming the processing mark in the brittle material removing step that is described later, it is difficult for a crack to occur in an end face (end face in the vicinity of an intersection region of the scheduled dividing line DL) of the brittle material layer 1.

Note that, as a method for controlling the output of the laser beam L1, for example, a method that performs pulse control of the excitation source of the first laser source 20a, or a method that turns the output of the laser beam L1 on/off using a mechanical shutter can be used.

Although in the present embodiment a mode is adopted in which, in the resin removing step, the laser beam L1 oscillated from the first laser source 20a is not irradiated multiple times in a region where the scheduled dividing lines DL intersect, the present invention is not limited thereto, and it is also possible to adopt a mode that, in a region where the scheduled dividing lines DL intersect, lowers the irradiation amount of the laser beam L1 relative to the irradiation amount in a region other than a region where the scheduled dividing lines DL intersect. Specifically, for example, when the laser beam L1 is scanned in the intersection region of the scheduled dividing lines DL for the second time or later, it is possible to perform control to make the output of the laser beam L1 lower than the output when the laser beam L1 was scanned in the intersection region for the first time (and to not lower the output of the laser beam L1 in a region other than a region where the scheduled dividing lines DL intersect).

Further, the resin removing step of the present embodiment is characterized in that the resin forming the resin layer 2 is removed in a manner so that one part thereof remains as a residue at the bottom of the processing groove 25. The thickness of the residue is preferably 1 to 30 μm. Although FIG. 1A illustrates an example in which only the bonding agent 24 remains as a residue, a mode may also be adopted in which a part of the polarizing film 21 also remains in addition to the bonding agent 24.

By removing the resin in a manner so that a residue remains in the bottom of the processing groove 25 in this way, an advantage is obtained such that, in comparison to a case where the resin forming the resin layer 2 is completely removed along the scheduled dividing line DL, the heat damage applied to the brittle material layer 1 is further reduced by an amount corresponding to the amount of residue remaining in the processing groove 25 and it is thus more difficult for a crack to occur in an end face of the brittle material layer 1.

<Brittle Material Removing Step>

Figure 1B:
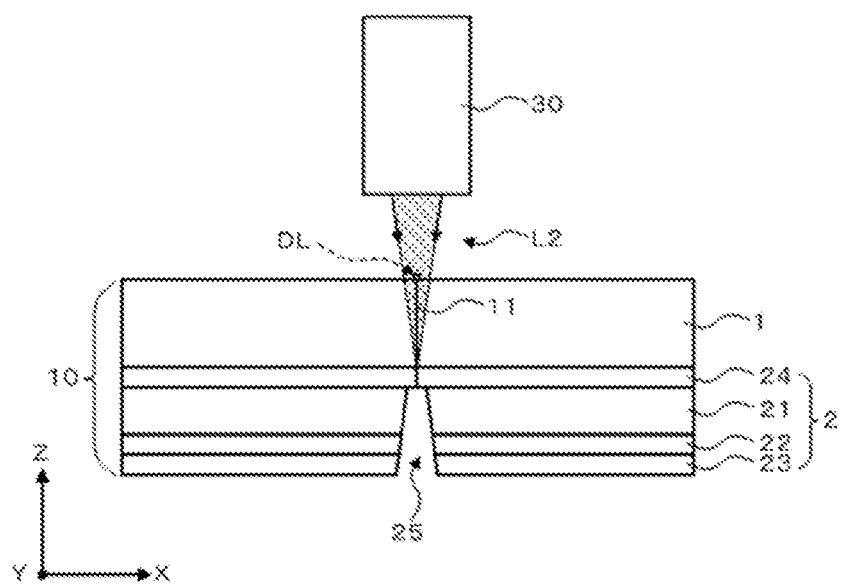
Figure 3A:
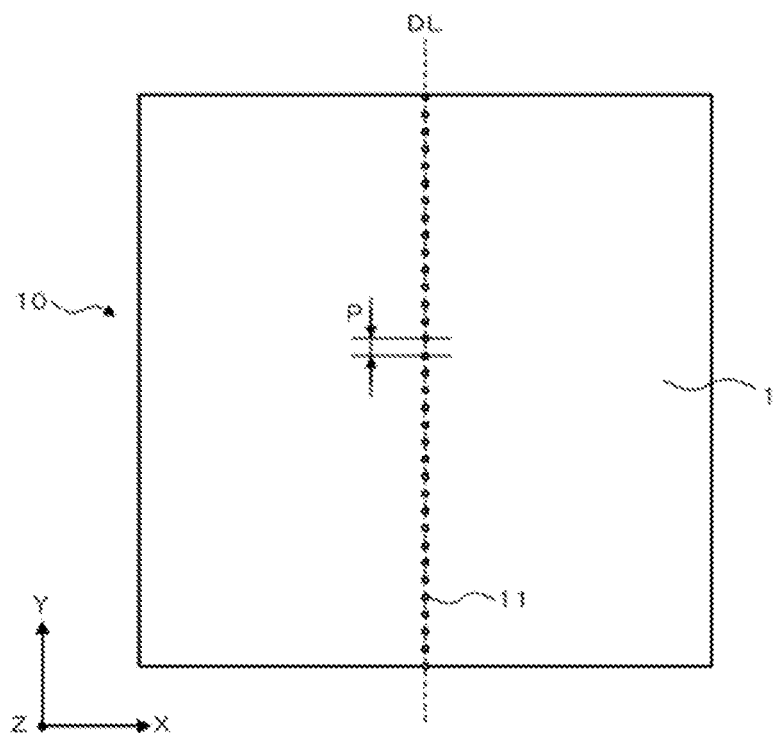
FIGS. 3A-3B are an explanatory diagrams for schematically describing a procedure of the method for dividing a composite material according to the embodiment of the present invention.
Figure 3B:
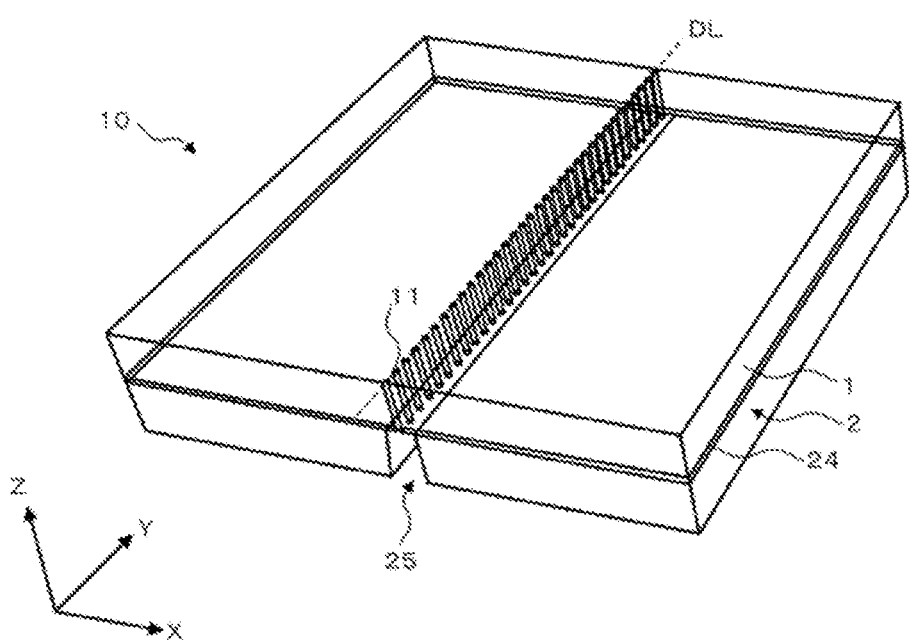

As illustrated in FIG. 1B and FIGS. 3A and 3B, in the brittle material removing step, after the resin removing step, a processing mark 11 along the scheduled dividing line DL is formed by irradiating the brittle material layer 1 with a laser beam (ultrashort pulsed laser beam) L2 oscillated (pulse oscillation) from an ultrashort pulsed laser source 30 along the scheduled dividing line DL, and thereby removing the brittle material forming the brittle material layer 1.

As the mode of irradiating the laser beam L2 along the scheduled dividing line DL (the mode of relatively scanning the laser beam L2), the same mode as the mode of irradiating the laser beam L1 along the scheduled dividing line DL that is described above can be adopted, and hence a detailed description thereof is omitted here.

The brittle material forming the brittle material layer 1 is removed by utilizing the filamentation phenomenon of the laser beam L2 oscillated from the ultrashort pulsed laser source 30, or applying a multi-focus optical system (not shown) or Bessel beam optical system (not shown) to the ultrashort pulsed laser source 30.

Note that the use of the filamentation phenomenon of the ultrashort pulsed laser beam and the application of the multi-focus optical system or the Bessel beam optical system to the ultrashort pulsed laser source are described in the aforementioned Non-Patent Literature 1. Further, a product relating to glass processing in which a multi-focus optical system is applied to an ultrashort pulsed laser source is commercially available from Trumpf Corporation of Germany. Thus, since utilization of the filamentation phenomenon of an ultrashort pulsed laser beam, and application of the multi-focus optical system or the Bessel beam optical system to an ultrashort pulsed laser source are known, detailed description thereof will be omitted here.

The processing mark 11 formed in the brittle material removing step of the present embodiment consists of perforation-like through holes along the scheduled dividing line DL. A pitch P of the through holes is determined by the repetition frequency of pulse oscillation and the relative moving speed (processing speed) of the laser beam L2 with respect to the composite material 10. In order to easily and stably perform the brittle material layer dividing step to be described later, preferably the pitch P of the through holes is set to 10 μm or less. More preferably, the pitch P is set to 5 μm or less. The diameter of the through hole is often formed to be 5 μm or less.

The wavelength of the laser beam L2 oscillated from the ultrashort pulsed laser source 30 is preferably 500 nm to 2500 nm, which exhibits high light transmittance when the brittle material forming the brittle material layer 1 is glass. In order to effectively cause a nonlinear optical phenomenon (multiphoton absorption), the pulse width of the laser beam L2 is preferably 100 picoseconds or less, and more preferably 50 picoseconds or less. The oscillation mode of the laser beam L2 may be single pulse oscillation or multi-pulse oscillation of a burst mode.

In the brittle material removing step of the present embodiment, the brittle material layer 1 is irradiated with the laser beam L2 oscillated from the ultrashort pulsed laser source 30 from the opposite side to the processing groove 25 formed in the resin removing step. In the example illustrated in FIGS. 1A and 1B, the first laser source 20a is disposed on the lower side in the Z direction with respect to the composite material 10 so as to face the resin layer 2, and the ultrashort pulsed laser source 30 is disposed on the upper side in the Z direction with respect to the composite material 10 so as to face the brittle material layer 1. Then, after the processing groove 25 is formed with the laser beam L1 oscillated from the first laser source 20a in the resin removing step, the oscillation of the laser beam L1 is stopped, and the processing mark 11 is formed with the laser beam L2 oscillated from the ultrashort pulsed laser source 30 in the brittle material removing step.

However, the present invention is not limited to this, and it is also possible to employ a method in which the first laser source 20a and the ultrashort pulsed laser source 30 are both disposed on the same side (upper side or lower side in the Z direction) with respect to the composite material 10, and the upper and lower sides of the composite material 10 are inverted using a known inverting mechanism so that the resin layer 2 faces the first laser source 20a in the resin removing step, and the brittle material layer 1 faces the ultrashort pulsed laser source 30 in the brittle material removing step.

If the laser beam L2 oscillated from the ultrashort pulsed laser source 30 is irradiated from the opposite side to the processing groove 25, even if a residue of the resin remains at the bottom of the processing groove 25, an appropriate processing mark 11 can be formed on the brittle material layer 1 without being affected by the residue.

However, the present invention is not limited to this, and may further include a cleaning step of removing the residue of the resin forming the resin layer 2 by subjecting the processing groove 25 formed in the resin removing step to cleaning by applying various wet-type and dry-type cleaning methods prior to the brittle material removing step. Further, it is also possible to form the processing mark 11 by irradiating the brittle material layer 1 with the laser beam L2 oscillated from the ultrashort pulsed laser source 30 from the processing groove 25 side in the brittle material removing step. If the residue of the resin forming the resin layer 2 is removed in the cleaning step, in the brittle material removing step the laser beam L2 oscillated from the ultrashort pulsed laser source 30 will not be affected by the residue of the resin even if the brittle material layer 1 is irradiated with the laser beam L2 from the processing groove 25 side, and thus an appropriate processing mark 11 can be formed in the brittle material layer 1.

<Brittle Material Layer Dividing Step>

Figure 2A:
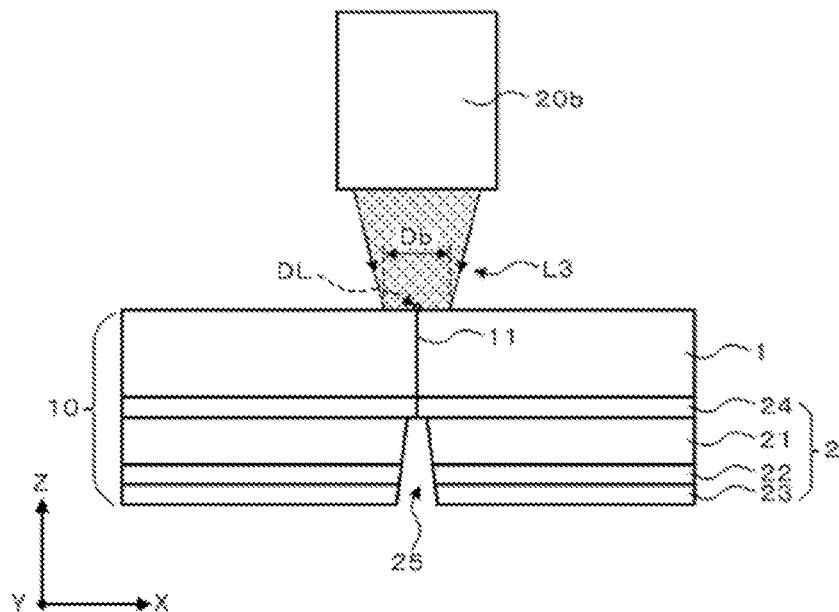
FIGS. 2A-2B are an explanatory diagrams for schematically describing a procedure of the method for dividing a composite material according to the embodiment of the present invention.

As illustrated in FIG. 2A, in the brittle material layer dividing step, after the brittle material removing step, the brittle material layer 1 is divided by applying heat to the brittle material layer 1 from the opposite side to the resin layer 2 along the scheduled dividing line DL to generate thermal stress in the brittle material layer 1. Specifically, by irradiating the brittle material layer 1 with a laser beam L3 oscillated from a second laser source 20b from the opposite side to the resin layer 2, thermal stress is generated in the brittle material layer 1 to thereby divide the brittle material layer 1.

As the mode of irradiating the laser beam L3 along the scheduled dividing line DL (the mode of relatively scanning the laser beam L3), the same mode as the mode of irradiating the laser beam L1 and the laser beam L2 along the scheduled dividing line DL that is described above can be adopted, and hence a detailed description thereof is omitted here.

Figure 2B:
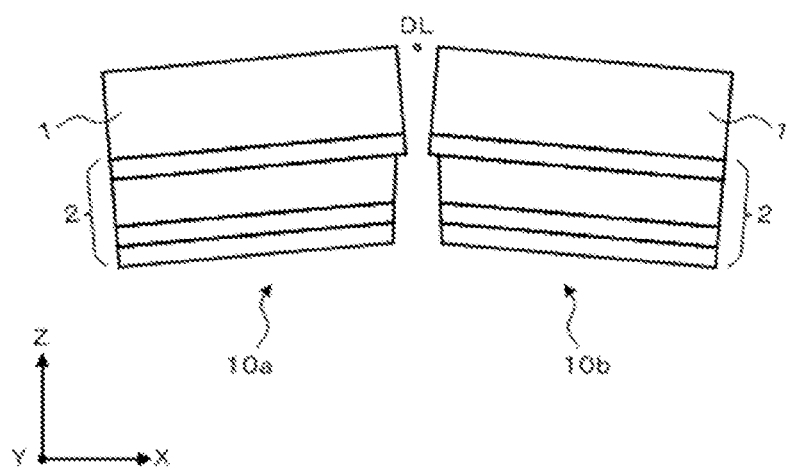

In addition, in the brittle material layer dividing step, as necessary, after thermal stress is generated in the brittle material layer 1, as illustrated in FIG. 2B, the brittle material layer 1 and, by extension, the composite material 10 may be reliably divided by applying a mechanical external force to the brittle material layer 1 along the scheduled dividing line DL. In the case of dividing the composite material 10 by mechanical breaking (mountain-folding), it is preferable to apply an external force with the brittle material layer 1 being on the mountain side (with the resin layer 2 being on the valley side) so that tensile stress acts on the brittle material layer 1. Further, after thermal stress is generated in the brittle material layer 1, the brittle material layer 1 and, by extension, the composite material 10 may be reliably divided by blowing air against the brittle material layer 1 from the processing groove 25 side along the scheduled dividing line DL. The air may be air at room temperature or may be hot air.

In this way, the brittle material layer 1 and, by extension, the composite material 10 is divided. In the example illustrated in FIG. 2B, the composite material 10 is divided into composite material pieces 10a and 10b.

In the present embodiment, a $CO_2$ laser source which oscillates a laser beam L3 having a wavelength of 9 to 11 μm in the infrared region is used as the second laser source 20b.

However, the present invention is not limited to this, and similarly to the first laser source 20a, it is also possible to use another laser source such as a CO laser source which oscillates a laser beam L3 having a wavelength of 5 μm as the second laser source 20b.

Further, with regard to the oscillation mode of the second laser source 20b as well as the spatial intensity distribution of the laser beam L3 that is oscillated, the same oscillation mode and spatial intensity distribution as in the case of the first laser source 20a can be adopted.

However, by changing or adjusting the condensing optical system used for the second laser source 20b or the like, a spot diameter Db (see FIG. 2A) at the irradiation position of the laser beam L3 oscillated from the second laser source 20b on the brittle material layer 1 is set to be larger than the spot diameter Da at the irradiation position of the laser beam L1 oscillated from the first laser source 20a on the resin layer 2. Specifically, the laser beam L3 is condensed so that the spot diameter Db becomes 2 mm or less. By this means, the influence of heat conduction on the resin layer 2 can be reduced. From the viewpoint of the influence of heat conduction on the resin layer 2, preferably the spot diameter Db is made 1.2 mm or less, more preferably 1 mm or less, and further preferably 0.9 mm or less. Furthermore, the laser beam L3 is condensed so that the spot diameter Db becomes 400 μm or more. By this means, there is the advantage that it is easy to irradiate the laser beam L3 along the scheduled dividing line DL. From the viewpoint that it is easy to irradiate the laser beam L3 along the scheduled dividing line DL, preferably the spot diameter Db is made 0.6 mm or more. In addition, the energy density at the irradiation position of the laser beam L3 on the brittle material layer 1 is set to 78 $W/mm^2$ or less. By this means, the influence of heat conduction on the resin layer 2 can be reduced.

In the brittle material dividing step of the present embodiment, as described above, the brittle material layer 1 is irradiated with the laser beam L3 oscillated from the second laser source 20b from the opposite side to the resin layer 2. In the example illustrated in FIG. 2A, similarly to the ultrashort pulsed laser source 30, the second laser source 20b is disposed on the upper side in the Z direction with respect to the composite material 10 so as to face the brittle material layer 1. Then, after the processing mark 11 is formed with the laser beam L2 oscillated from the ultrashort pulsed laser source 30 in the brittle material removing step, the oscillation of the laser beam L2 is stopped, and the brittle material layer 1 is divided with the laser beam L3 oscillated from the second laser source 20b in the brittle material dividing step.

However, the present invention is not limited to this, and it is also possible to employ a method in which the second laser source 20b is disposed on the lower side in the Z direction with respect to the composite material 10, and in the brittle material layer dividing step, the upper and lower sides of the composite material 10 after the processing mark 11 is formed (see FIG. 1B) in the brittle material removing step are inverted using a known inverting mechanism.

According to the dividing method according to the present embodiment that is described above, after the processing groove 25 is formed along the scheduled dividing line DL by removing resin forming the resin layer 2 in the resin removing step, in the brittle material removing step the processing mark 11 is formed along the same scheduled dividing line DL by removing brittle material forming the brittle material layer 1. Thereafter, in the brittle material layer dividing step, thermal stress is generated in the brittle material layer 1 by applying heat to the brittle material layer 1 by means of the laser beam L3 oscillated from the second laser source 20b from the opposite side to the resin layer 2 along the same scheduled dividing line DL. By this means, it is possible to divide the brittle material layer 1 without generating a crack in an end face of the brittle material layer 1 (end face along the scheduled dividing line DL) and also without deteriorating the quality level of an end portion (end portion along the scheduled dividing line DL) of the resin layer.

Hereunder, one example of results obtained by performing a test in which the composite material 10 was divided using the dividing method according to the present embodiment (Examples 1 to 11) and a dividing method according to Reference Example will be described.

FIG. 4 shows conditions and evaluation results for the test according to Examples 1 to 11 and Reference Example.

EXAMPLE 1

In Example 1, first, a polyvinyl alcohol-based film was dyed with a dichroic material such as iodine or a dichroic dye and the film was also uniaxially stretched to obtain a polarizer. The thickness of the polarizer was 28 μm.

Next, an acrylic-based protective film (thickness: 40 μm) was bonded to one side of the polarizer, and a triacetylcellulose-based protective film (thickness: 30 μm) was bonded to the other side to obtain the polarizing film 21. Next, a polyethylene terephthalate release film (thickness: 38 μm) as the release liner 23 was bonded to the polarizing film 21 via an acrylic-based pressure-sensitive adhesive (thickness: 30 μm) as the pressure-sensitive adhesive 22 to thus obtain the main body of the resin layer 2.

On the other hand, a glass film (manufactured by Nippon Electric Glass Co., Ltd.; trade name "OA-10G"; thickness: 100 μm) was prepared as the brittle material layer 1.

Further, as the bonding agent 24, an epoxy-based bonding agent was prepared by mixing 70 parts by weight of Celoxide 2021P (manufactured by Daicel Chemical Industries Limited), 5 parts by weight of EHPE 3150, 19 parts by weight of ARON OXETANE OXT-221 (manufactured by Toagosei Company, Limited), 4 parts by weight of KBM-403 (manufactured by Shin-Etsu Chemical Co., Ltd., and 2 parts by weight of CPI-101A (manufactured by San-Apro Ltd.).

Next, the aforementioned brittle material layer 1 and the aforementioned main body of the resin layer 2 were bonded via the aforementioned bonding agent 24. At such time, the main body of the resin layer 2 was disposed so that the acrylic-based protective film was on the brittle material layer 1 side. Next, the bonding agent 24 was irradiated with ultraviolet rays (500 mJ/cm$^2$) using a high-pressure mercury lamp to cure the bonding agent 24, thereby obtaining the composite material 10. The thickness of the bonding agent 24 after curing was 5 μm.

After making the composite material 10 obtained as described above into a sheet-like shape, the resin removing step was executed. Specifically, TLSU-series (oscillation wavelength: 9.4 μm; power of laser beam L1: 250 W) manufactured by Takei Electric Industries Co., Ltd. was used as a laser beam processing device equipped with an optical system and a control device for controlling scanning of the first laser source 20a and the laser beam L1, the output of the laser beam L1 oscillated from the first laser source 20a was set to 20 W, and the laser beam was condensed to a spot diameter of 100 μm using a condensing lens and irradiated onto the resin layer 2 along scheduled dividing lines (plurality of scheduled dividing lines that were set in a grid pattern) DL of the composite material 10. The relative moving speed (processing speed) of the laser beam L1 with respect to the composite material 10 was set to 500 mm/sec. By this means, resin forming the resin layer 2 was removed, and the processing groove 25 was formed along the scheduled dividing line DL. At this time, the resin was removed in a manner so that a part of the resin forming the resin layer 2 remained as a residue (thickness: 10 to 20 μm) at the bottom of the processing groove 25. Further, a configuration was adopted so that, in regions where the scheduled dividing lines DL intersected, when the laser beam L1 was about to be scanned for the second time, the output of the laser beam L1 was controlled to 0% to ensure that the laser beam L1 was not irradiated multiple times onto a region IS where the scheduled dividing lines DL intersected.

After the aforementioned resin removing step, the brittle material removing step was executed. Specifically, as the ultrashort pulsed laser source 30, a laser source having an oscillation wavelength of 1064 nm, a pulse width of the laser beam L2 of 10 picoseconds, a repetition frequency of pulse oscillation of 50 kHz, and average power of 10 W was used to irradiate the brittle material layer 1 of the composite material 10 with the laser beam L2 oscillated from the ultrashort pulsed laser source 30 from the opposite side (brittle material layer 1 side) to the resin layer 2 via a multi-focus optical system. When the relative moving speed (processing speed) of the laser beam L2 with respect to the composite material 10 was set to 100 mm/sec and the laser beam L2 was scanned along the scheduled dividing lines DL, perforation-like through holes (with a diameter of about 1 to 2 μm) having a pitch of 2 μm were formed as the processing mark 11.

After the aforementioned brittle material removing step, the brittle material dividing step was executed. Specifically, MLG-9300 (oscillation wavelength: 10.6 μm; power of laser beam L3: 30 W) manufactured by KEYENCE Corporation was used as a laser beam processing device equipped with an optical system and a control device for controlling scanning of the second laser source 20b and the laser beam L3, the output of the laser beam L3 oscillated from the second laser source 20b was set to 80% (that is, output of 24 W), and the laser beam was condensed to a spot diameter of 0.7 mm (the energy density at this time was 62 W/m$^2$) using a condensing lens and irradiated onto the brittle material layer 1 from the opposite side to the resin layer 2 along the scheduled dividing lines DL of the composite material 10. At this time, the relative moving speed of the laser beam L3 with respect to the composite material 10 was set to 500 mm/sec.

Finally, a mechanical external force was applied to the composite material 10 to divide the residue of the resin that remained at the bottom of the processing groove 25 after the resin removing step, and thus the composite material 10 was divided.

EXAMPLES 2 TO 11

In Examples 2 to 11, as shown in FIG. 4, at least one parameter among the output of the second laser source 20b, the spot diameter Db of the laser beam L3, and the relative moving speed of the laser beam L3 was set to a different value compared to Example 1, and the other conditions were set the same as in Example 1, and the composite material 10 was divided.

REFERENCE EXAMPLE

In Reference Example, the composite material 10 was divided under the same conditions as in Example 1 except that the brittle material layer 1 was irradiated with the laser beam L3 oscillated from the second laser source 20b from the resin layer 2 side.

<Evaluation Contents and Evaluation Results>

The end faces of the brittle material layer 1 of the composite material 10 (composite material pieces) divided by the dividing methods according to Examples 1 to 11 and Reference Example were subjected to visual observation and the presence or absence of a crack was evaluated.

The characters "A" and "B" described in the column "Division State of Brittle Material Layer" in FIG. 4 mean the result was as follows, respectively.

A: The brittle material layer 1 was divided (fractured) without a problem, and a crack did not occur.

B: The brittle material layer 1 was divided (fractured) without a problem, and a slight crack having a size which is not a problem as a product occurred.

Further, the end portion of the resin layer 2 of the composite material (composite material pieces) divided by the dividing method according to Examples 1 to 11 and Reference Example was observed using a microscope (VHX-2000 manufactured by KEYENCE Corporation), and the range of a discoloration region (also referred to as a "yellow band") associated with thermal degradation of the resin layer 2 (polarizing film 21) was evaluated.

Figure 5:
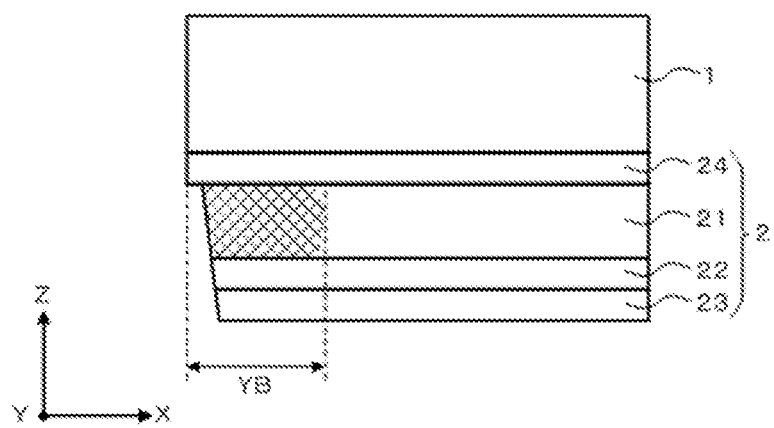
FIG. 5 is an explanatory diagram for describing a heat discoloration width.

The characters "A", "B" and "C" described in the column "Heat Discoloration Width" in FIG. 4 mean the result was as follows, respectively. Note that, the term "heat discoloration width" means, as illustrated in FIG. 5, in a cross section of the composite material 10, with reference to the end face of the divided brittle material layer 1, a distance YB to the innermost point of a region (the hatched region in FIG. 5) in which discoloration (yellowish discoloration) occurred in the resin layer 2.

A: discoloration width YB is less than 200 μm (very good)
B: discoloration width YB is less than 500 μm (good)
C: discoloration width YB is less than 1000 μm (acceptable)
D: discoloration width YB is 1000 μm or more (unacceptable)

As shown in FIG. 4, in each of the dividing methods according to Examples 1 to 11 and Reference Example, the evaluation for "Division State of Brittle Material Layer" was either "A" or "B", and a problem did not occur when dividing the brittle material layer 1.

Note that, it is considered that the reason the evaluation for "Division State of Brittle Material Layer" was "B" in the dividing methods according to Examples 5 and 6 was that the spot diameter Db was small and/or the energy density of the laser beam L3 was small. When the spot diameter Db is small, the energy at the spot portion is high and the energy abruptly becomes lower at a location away from the spot portion, and therefore in a case where the energy irradiation position deviates from the scheduled dividing line DL, it is difficult to divide the composite material.

It is considered that the reason the evaluation for "Division State of Brittle Material Layer" was "B" in the dividing methods according to Examples 7 and 11 was that the energy density of the laser beam L3 was small.

Further, in each of the dividing methods according to Examples 1 to 11, the evaluation for "Heat Discoloration Width" was any of "A", "B" and "C", and a problem did not occur with respect to the quality level of the end portion of the resin layer 2. Note that, it is considered that the reason the evaluation for "Heat Discoloration Width" was "C" in the dividing method according to Example 11 was that although the energy density of the laser beam L3 was small (0.95 W/mm$^2$), because the relative moving speed of the laser beam L3 with respect to the composite material 10 was low (25 mm/sec), the influence of heat conduction from the brittle material layer 1 side to the resin layer 2 side occurred.

On the other hand, in the dividing method according to Reference Example, the evaluation for "Heat Discoloration Width" was "D", and there was a problem with the quality level of the end portion of the resin layer 2. It is considered that, in the dividing method according to Reference Example, because the resin layer 2 was irradiated directly with the laser beam L3 oscillated from the second laser source 20b, a discolored region associated with thermal degradation became wide.

1 Brittle Material Layer
2 Resin Layer
10 Composite Material
11 Processing Mark
20a First Laser Source
20b Second Laser Source
21 Polarizing Film
24 Bonding Agent
25 Processing Groove
30 Ultrashort Pulsed Laser Source
DL Scheduled Dividing Line
L1, L2, L3 Laser Beam
YB Discoloration Width

The invention claimed is:

1. A method for dividing a composite material in which a brittle material layer and a resin layer are laminated, the method comprising:

a resin removing step of irradiating the resin layer with a laser beam oscillated from a first laser source along a scheduled dividing line of the composite material to remove a resin forming the resin layer, to thereby form a processing groove along the scheduled dividing line;

after the resin removing step, a brittle material removing step of irradiating the brittle material layer with a laser beam oscillated from an ultrashort pulsed laser source along the scheduled dividing line to remove a brittle material forming the brittle material layer, to thereby form a processing mark along the scheduled dividing line; and after the brittle material removing step, a brittle material layer dividing step of applying heat to the brittle material layer from an opposite side to the resin layer along the scheduled dividing line to generate thermal stress in the brittle material layer, to thereby divide the brittle material layer, in the brittle material layer dividing step, thermal stress is generated in the brittle material layer by irradiating the brittle material layer with a laser beam oscillated from a second laser source from an opposite side to the resin layer;

in the brittle material layer dividing step, a spot diameter of the laser beam oscillated from the second laser source at an irradiation position on the brittle material layer is 0.6 mm or more to 2 mm or less;

in the resin removing step, the resin forming the resin layer is removed in a manner so that one part thereof remains as a residue having a thickness of 1 to 30 μm; and in the brittle material layer dividing step, after thermal stress is generated in the brittle material layer, a mechanical external force is applied to the brittle material layer along the scheduled dividing line.

2. The method for dividing a composite material according to claim 1, wherein the second laser source used in the brittle material layer dividing step is a CO$_2$ laser source.

3. The method for dividing a composite material according to claim 1, wherein in the brittle material layer dividing step, an energy density of the laser beam oscillated from the second laser source at an irradiation position on the brittle material layer is 78 W/mm$^2$ or less.

4. The method for dividing a composite material according to claim 1, wherein in the resin removing step, a spot diameter of the laser beam oscillated from the first laser source at an irradiation position on the resin layer is 300 μm or less.

5. The method for dividing a composite material according to claim 1, wherein a thickness of the brittle material layer is 30 to 150 μm, and a thickness of the resin layer is 50 to 300 μm.

6. The method for dividing a composite material according to claim 1, wherein in the brittle material layer dividing step, after thermal stress is generated in the brittle material layer, air is blown against the brittle material layer from a processing groove side along the scheduled dividing line.

7. The method for dividing a composite material according to claim 1, wherein the brittle material layer includes glass, and the resin layer includes a polarizing film.

8. The method for dividing a composite material according to claim 1, wherein a discoloration region associated with thermal degradation of the resin layer after the brittle material layer dividing step is a region of less than 1000 μm from an end face of the brittle material layer that is divided.

* * * * *